US009525641B1

(12) United States Patent
Greene et al.

(10) Patent No.: US 9,525,641 B1
(45) Date of Patent: Dec. 20, 2016

(54) FACILITATING BUFFER WAIT TIME DETERMINATION BASED ON DEVICE- OR ENTITY-RELATED CONDITIONS

(71) Applicant: Google Inc., Mountain View, CA (US)

(72) Inventors: Kevin Greene, San Francisco, CA (US); Justin Lewis, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 338 days.

(21) Appl. No.: 14/163,821

(22) Filed: Jan. 24, 2014

(51) Int. Cl.
| | | |
|---|---|---|
| *H04N 21/234* | (2011.01) | |
| *H04L 12/835* | (2013.01) | |
| *H04L 12/933* | (2013.01) | |
| *H04L 1/18* | (2006.01) | |
| *H04L 12/861* | (2013.01) | |
| *H04L 12/883* | (2013.01) | |
| *H04N 21/44* | (2011.01) | |

(52) U.S. Cl.
CPC .............. *H04L 47/30* (2013.01); *H04L 1/1835* (2013.01); *H04L 49/103* (2013.01); *H04L 49/108* (2013.01); *H04L 49/9021* (2013.01); *H04L 49/9047* (2013.01); *H04N 21/23406* (2013.01); *H04N 21/44004* (2013.01)

(58) Field of Classification Search
CPC .. G06F 13/28; G06F 15/17318; G06F 3/0482; G10L 19/005; H04L 29/06027; H04L 47/10; H04L 47/30; H04L 1/1835; H04L 49/103; H04L 49/108; H04L 49/9021; H04L 49/9047; H04N 21/23406; H04N 21/234327; H04N 21/41422; H04N 21/812; H04N 21/44004; H04N 5/783; H04W 76/027
See application file for complete search history.

(56) References Cited

U.S. PATENT DOCUMENTS

| | | | |
|---|---|---|---|
| 7,796,999 B1 | 9/2010 | Martin et al. | |
| 8,873,395 B1* | 10/2014 | Prock ................. | H04W 76/027 370/235 |
| 9,247,313 B1* | 1/2016 | Lewis ................. | H04N 21/812 |
| 2002/0194609 A1 | 12/2002 | Tran | |
| 2006/0045138 A1* | 3/2006 | Black ................... | G10L 19/005 370/516 |

(Continued)

OTHER PUBLICATIONS

Office Action for U.S. Appl. No. 14/148,360, dated Dec. 18, 2014, 49 pages.

(Continued)

*Primary Examiner* — Le Luu
(74) *Attorney, Agent, or Firm* — Fenwick & West LLP

(57) ABSTRACT

Systems and methods that relate to determination of buffer wait time based on defined parameters are described. A method includes: determining, by a first device including a processor, information associated with one or more defined parameters; and generating a buffer wait time based on the information, wherein the information is associated with at least one of an entity for which buffering of content will be provided or a second device that performs playback of the content. The defined parameters can include, but are not limited to, the type of the second device (e.g., Android operating system 3 or Android operating system 4), the type of connection for the second device (e.g., Long-Term Evolution, 3G) or a geographical location of the second device.

24 Claims, 13 Drawing Sheets

(56) References Cited

U.S. PATENT DOCUMENTS

| | | | |
|---|---|---|---|
| 2008/0107173 A1* | 5/2008 | van Beek | H04N 21/23406 375/240.02 |
| 2008/0276272 A1 | 11/2008 | Rajaraman et al. | |
| 2009/0161765 A1* | 6/2009 | Joyce | H04N 5/783 375/240.23 |
| 2012/0099514 A1* | 4/2012 | Bianchetti | H04N 21/41422 370/312 |
| 2012/0124251 A1* | 5/2012 | Hnatko | G06F 13/28 710/29 |
| 2012/0166669 A1* | 6/2012 | Price | H04L 29/06027 709/231 |
| 2012/0331106 A1* | 12/2012 | Ramamurthy | H04N 21/234327 709/218 |
| 2013/0014182 A1 | 1/2013 | Nussel et al. | |
| 2013/0117403 A1* | 5/2013 | Archer | G06F 15/17318 709/212 |
| 2013/0132854 A1* | 5/2013 | Raleigh | G06F 3/0482 715/738 |
| 2013/0155858 A1* | 6/2013 | Chen | H04L 47/10 370/235 |
| 2013/0188482 A1 | 7/2013 | Lee | |
| 2013/0263179 A1 | 10/2013 | Dow et al. | |
| 2015/0095509 A1 | 4/2015 | Huang et al. | |

OTHER PUBLICATIONS

Office Action for U.S. Appl. No. 14/148,360, dated Jul. 9, 2015, 61 pages.
Dobrian, F., et al., "Understanding the Impact of Video Quality on User Engagement," SIGCOMM '11, Aug. 15-19, 2011, Toronto, Ontario, Canada, 12 pages.

* cited by examiner

| BUFFER WAIT TIME | DEVICE TYPE | CLIENT TYPE | OBSERVED BIT RATE | NETWORK TYPE | GEOGRAPHIC LOCATION | TIME OF DAY | LENGTH OF VIDEO | VIDEO TYPE |
|---|---|---|---|---|---|---|---|---|
| 7 SECONDS | iPhone OS 3 | iOS NATIVE APP | X BITS/SECOND | 3G | MANHATTAN BEACH, CA USA | 3 PM | 3.05 MINUTES | LIVE STREAMING |
| 4 SECONDS | Android 3 | ANDROID NATIVE APP | Y BITS/SECOND | 4G | CHICAGO, IL USA | 1:45 AM | 20 SECONDS | VIDEO ON DEMAND |
| 2 SECONDS | Android 4 | ANDROID NATIVE APP | Z BITS/SECOND | EDGE | PARIS, FRANCE EUR | 10 PM | 1.14 MINUTES | VIDEO ON DEMAND |

400

FIG. 4 ded conditions. In one embodiment, a system includes: a memory storing computer executable components; and a processor configured to execute the following computer executable components stored in the memory. The computer executable components include an interface component that facilitates a display indicative of an option to select one or more values for respective one or more defined parameters about an entity. The computer executable components also include a buffer analysis component that: determines a buffer wait time from a plurality of candidate buffer wait times for the entity, wherein each of the candidate buffer wait times is associated with one of a plurality of levels of experience for the entity.

FACILITATING BUFFER WAIT TIME DETERMINATION BASED ON DEVICE- OR ENTITY-RELATED CONDITIONS

TECHNICAL FIELD

This disclosure relates to processing that facilitates buffer wait time determination based on device- or entity-related conditions.

BACKGROUND

With advances in modern technology, numerous different types of content can be processed and/or provided to users via the Internet. A plethora of services and/or content can increase user time viewing content online. However, user enjoyment can be reduced in cases of excessive buffering prior to or during playback of content.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

Systems and methods in this disclosure relate to processing that facilitates buffer wait time determination based on device- or entity-related conditions. In one embodiment, a system includes: a memory storing computer executable components; and a processor configured to execute the following computer executable components stored in the memory. The computer executable components include an interface component that facilitates a display indicative of an option to select one or more values for respective one or more defined parameters about an entity. The computer executable components also include a buffer analysis component that: determines a buffer wait time from a plurality of candidate buffer wait times for the entity, wherein each of the candidate buffer wait times is associated with one of a plurality of levels of experience for the entity.

While the term "buffer wait time" is employed throughout the disclosure, in some embodiments, the buffer wait time can represent a maximum buffer wait time that the device that plays back content should not exceed in buffering time. As such, buffer wait time can be a time for buffering in some embodiments or a time that buffering should not exceed in other embodiments.

In another embodiment, a method includes: receiving, by a first device including a processor, information indicative of one or more defined parameters for an entity; and generating a buffer wait time for the entity, wherein the generating comprises employing a function that predicts a likelihood that watch time for the entity with the buffer wait time exceeds an average watch time for the entity with another buffer wait time, wherein the likelihood meets a defined condition.

In another embodiment, a method includes: determining, by a first device including a processor, information associated with one or more defined parameters; and generating a buffer wait time based on the information, wherein the information is associated with at least one of an entity for which buffering of content will be provided or a second device that performs playback of the content.

In another embodiment, provided is a computer-readable storage medium storing computer-executable instructions that, in response to execution, cause a first device including a processor to perform operations. The operations include: determining information associated with one or more defined parameters for a device that requests content for playback at the device; and generating a buffer wait time for the device to buffer the content, wherein the buffer wait time is based on the information, and wherein the information is associated with at least one of a network to which the device is connected, whether the device is located in a first type of country or a second type of country or the operating system of the device.

In another embodiment, another method includes: identifying, by a device comprising a processor, one or more values for respective one or more defined parameters, wherein the one or more defined parameters are associated with at least one of an entity associated with the device, a type of the device, a network associated with the device or a type of content for playback on the device; and determining a buffer wait time for playback of content on the device based on the one or more values one or more defined parameters.

Toward the accomplishment of the foregoing and related ends, the one or more embodiments include the features hereinafter fully described and particularly pointed out in the claims. The following description and the annexed drawings set forth in this disclosure detail certain illustrative aspects of the one or more embodiments. These aspects are indicative, however, of but a few of the various ways in which the principles of various embodiments can be employed, and the described embodiments are intended to include all such aspects and their equivalents.

DESCRIPTION OF THE DRAWINGS

FIG. 4 is an illustration of a non-limiting block diagram of a table of maximum buffer wait times for different conditions in accordance with one or more embodiments described herein.

DETAILED DESCRIPTION

Figure 1:
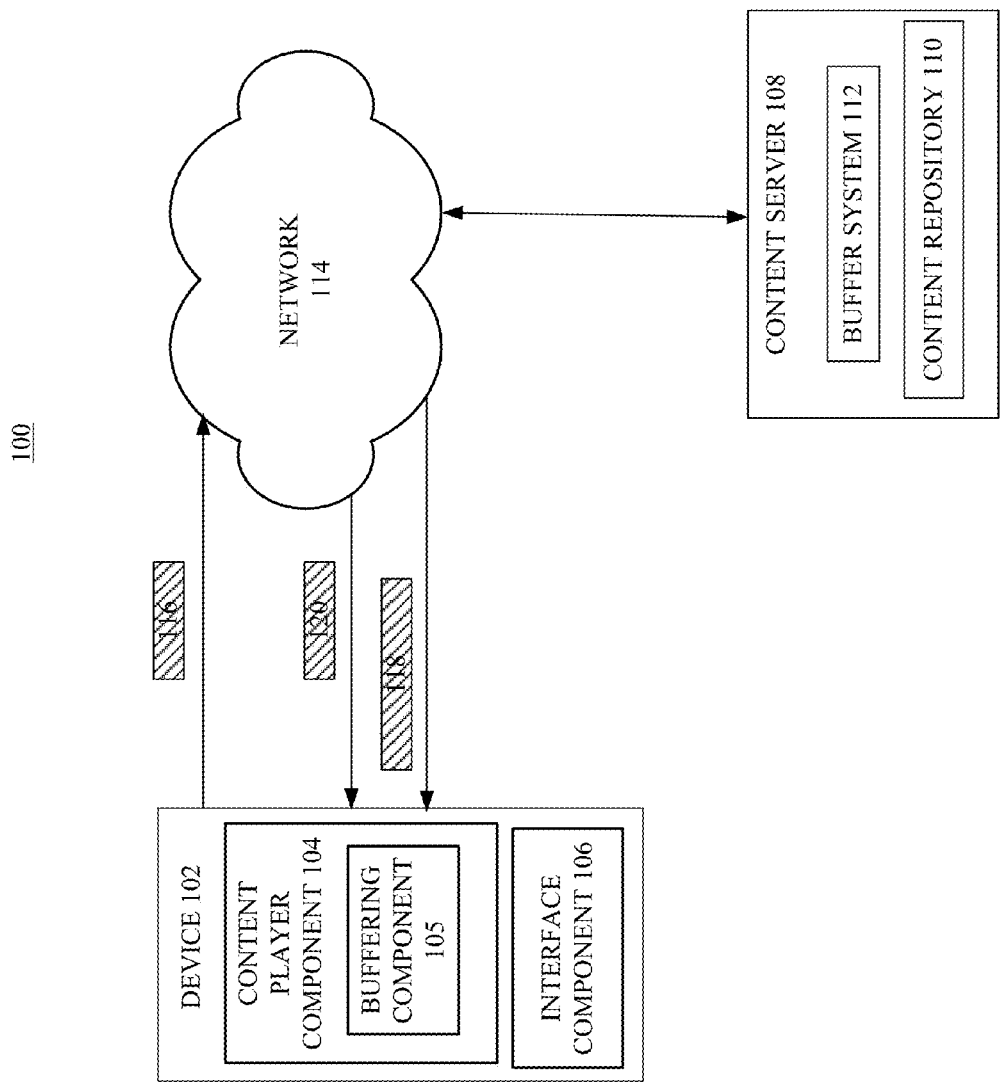
FIG. 1 is an illustration of a non-limiting block diagram of a system that facilitates buffer wait time determination based on device- or entity-related conditions in accordance with one or more embodiments described herein.

Various embodiments are now described with reference to the drawings, wherein like reference numerals are used to refer to like elements throughout. In the following description, for purposes of explanation, numerous specific details are set forth in order to provide a more thorough understanding of one or more embodiments. It is evident, however, that such embodiments can be practiced without these specific details. In various instances, structures and devices are shown in block diagram form in order to facilitate describing one or more embodiments.

There are many video players that have been written over the years. Video delivery/streaming over the Internet is massive and is growing rapidly. Research has shown that perceived video quality and the overall watch experience have an impact on user retention.

Researchers use buffer ratio and join time to measure the effects of the watch experience on user retention. Join time is the average length of time for a video (or other content) to start playing after initiation of loading. A one percent increase in average buffer ratio for a live video has been shown to decrease user watch time by an average of over three minutes. When join time is large, users watch fewer videos in a session. Accordingly, improving user experience is important for longer user watch times per video and per session of two or more videos.

The number of buffering events per session length (e.g., RateBuf variable) can also impact user watch time. For example, a user may experience buffering an average of three times per minute. The number of buffering events per session can be reduced if buffering occurs for longer prior to playback; however, join time will then be greater. There is, therefore, a delicate balance between setting a buffer wait time such that the number of buffering events per session and the join time do not lead to a decrease in user watch time. As used herein, the term "buffer wait time" means the amount of time that a content player buffers content prior to commencement of playback of the content by the content player, or in some embodiments, the amount of time that a content player buffers content during playback but prior to completion of playback of the entirety of the content.

Embodiments described herein facilitate buffer wait time determination based on device- or entity-related conditions. In one scenario, for example, a system includes: a memory storing computer executable components; and a processor configured to execute computer executable components stored in the memory. The computer executable components can include an interface component that facilitates a display indicative of an option to select one or more values for respective one or more defined parameters about an entity. The computer executable components can also include a buffer analysis component that determines a buffer wait time from a plurality of candidate buffer wait times for the entity, wherein each of the candidate buffer wait times is associated with one of a plurality of levels of experience for the entity.

In another scenario, a method includes: receiving, by a first device including a processor, information indicative of one or more defined parameters for an entity; and generating a buffer wait time for the entity, wherein the generating comprises employing a function that predicts a likelihood that watch time for the entity with the buffer wait time exceeds an average watch time for the entity with another buffer wait time, wherein the likelihood meets a defined condition.

In another scenario, a method includes: determining, by a first device includes a processor, information associated with one or more defined parameters; and generating a buffer wait time based on the information, wherein the information is associated with at least one of an entity for which buffering of content will be provided or a second device that performs playback of the content.

In another scenario, a computer-readable storage medium storing computer-executable instructions that, in response to execution, cause a first device including a processor to perform operations is provided. The operations include: determining information associated with one or more defined parameters for a device that requests content for playback at a second device; and generating a buffer wait time for the second device to buffer the content, wherein the buffer wait time is based on the information, and wherein the information is associated with at least one of a network to which the second device is connected, whether the second device is located in a first type of country or a second type of country or the operating system of the second device.

In another scenario, a method includes: identifying, by a device including a processor, one or more values for respective one or more defined parameters, wherein the one or more defined parameters are associated with at least one of an entity associated with the device, a type of the device, a network associated with the device or a type of content for playback on the device; and determining a buffer wait time for playback of content on the device based on the one or more values one or more defined parameters.

One or more embodiments described herein can advantageously identify a buffer wait time for an entity (or device with which the entity is associated) that is tailored to a particular set of entity- or device-related conditions to maintain a defined amount or percent of user watch time, thereby controlling the likelihood of abandonment of content prior to or during playback.

One or more embodiments can advantageously dynamically adjust buffer wait time before or during playback of content. For example, embodiments described herein can allow playback of the same content (e.g., video) across multiple different devices and the buffer wait time for the content can change dynamically as the values for the parameters (e.g., type of network to which device is connected, geographical location of device) change.

Turning now to the drawings, FIG. 1 is an illustration of a non-limiting block diagram of a system that facilitates buffer wait time determination based on device- or entity-related conditions in accordance with one or more embodiments described herein. As shown in FIG. 1, system 100 can include device 102, content server 108, content repository 110, buffer system 112 and/or network 114. In various embodiments, one or more of device 102, content server 108, content repository 110 and/or buffer system 112 can be electrically and/or communicatively coupled to one another via network 114 to perform one or more functions of system 100. Further, in some embodiments, content server 108 can include content repository 110 and/or buffer system 112 while, in other embodiments, content server 108, content repository 110 and/or buffer system 112 can be separate entities that are communicatively coupled to one another directly or via network 114.

Device 102 can include hardware and/or software configured to request, via network 114, of content (e.g., content 118), playback received content, playback content previously stored or buffered at device 102, buffer or process content and/or store buffer control information (e.g., buffer wait time). In various embodiments, device 102 can include, but is not limited to, a cellular telephone, a tablet computer, a laptop computer, a personal digital assistant (PDA), a desktop computer or any device able to playback content, whether received over network 114 or previously-stored at device 102. Content 118 can be any number of different types of content including, but not limited to, audio, images, video, text, social media content (e.g., social media feed items), advertising content or the like. In some embodiments, content 118 can be cloud-based and shared over network 114.

As shown, device 102 can include content player component 104 (which can include buffering component 105) and interface component 106. Content player component 104 can include hardware and/or software configured to initiate a request for content for playback at content player component 104. For example, message 116 identifying content for playback at content player component 104 can be transmitted via network 114 to content server 108.

In some embodiments, message 116 can also include information indicative of values of one or more defined parameters can also be transmitted. The information can be transmitted to buffer system 112 of content server 108. In embodiments in which buffer system 112 is a separate entity from content server 108, the information indicative of values of one or more defined parameters can be transmitted to buffer system 112 from device 102 and/or from content server 108.

Buffer system 112 can determine a buffer wait time and transmit buffer control information 120 including buffer wait time (or including information indicative of the buffer wait time) to device 102. For example, buffer system 112 can transmit the buffer wait time or an indicator that references a buffer wait that is previously-stored in device 102.

The one or more defined parameters can be entity-related or device-related. For example, entity-related information can include biographical information (e.g., age, gender, name) about an entity (e.g., user or owner) associated with device 102. Device-related defined parameters can include, but are not limited to, geographical location of device 102 (or entity associated with device 102), type of device 102 (e.g., Android 3, Android 4, Android 5, iPhone Operating System (OS) 3, iPhone OS 4, iPhone OS 5), type of connection/network to which device 102 is associated (e.g., 3G, Long-Term Evolution (LTE)/4G, Enhanced Data rates for GSM Evolution (EDGE) network), time of day of request (e.g., daytime, evening, 9:00 a.m. Pacific Daylight Time), the length of the content requested (e.g., longer than a defined threshold, shorter than a defined threshold, 3 minutes) and/or type of content (e.g., video on demand, live streaming video).

The values for the one or more defined parameters can be specified (e.g., via interface component 106 of device 102) and received by buffer system 112 for determination of buffer wait time for device 102. In various embodiments, device 102 can transmit information indicative of values for any number of the above-referenced defined parameters.

In some embodiments, in lieu of device 102 transmitting information for the request in message 116, buffer system 112 can retrieve previously-stored information indicative of values for the one or more defined parameters for device 102 and/or an entity associated with device 102. In this regard, information transmitted from device 102 can be minimized while maintaining benefits of the embodiments described.

Figure 5:
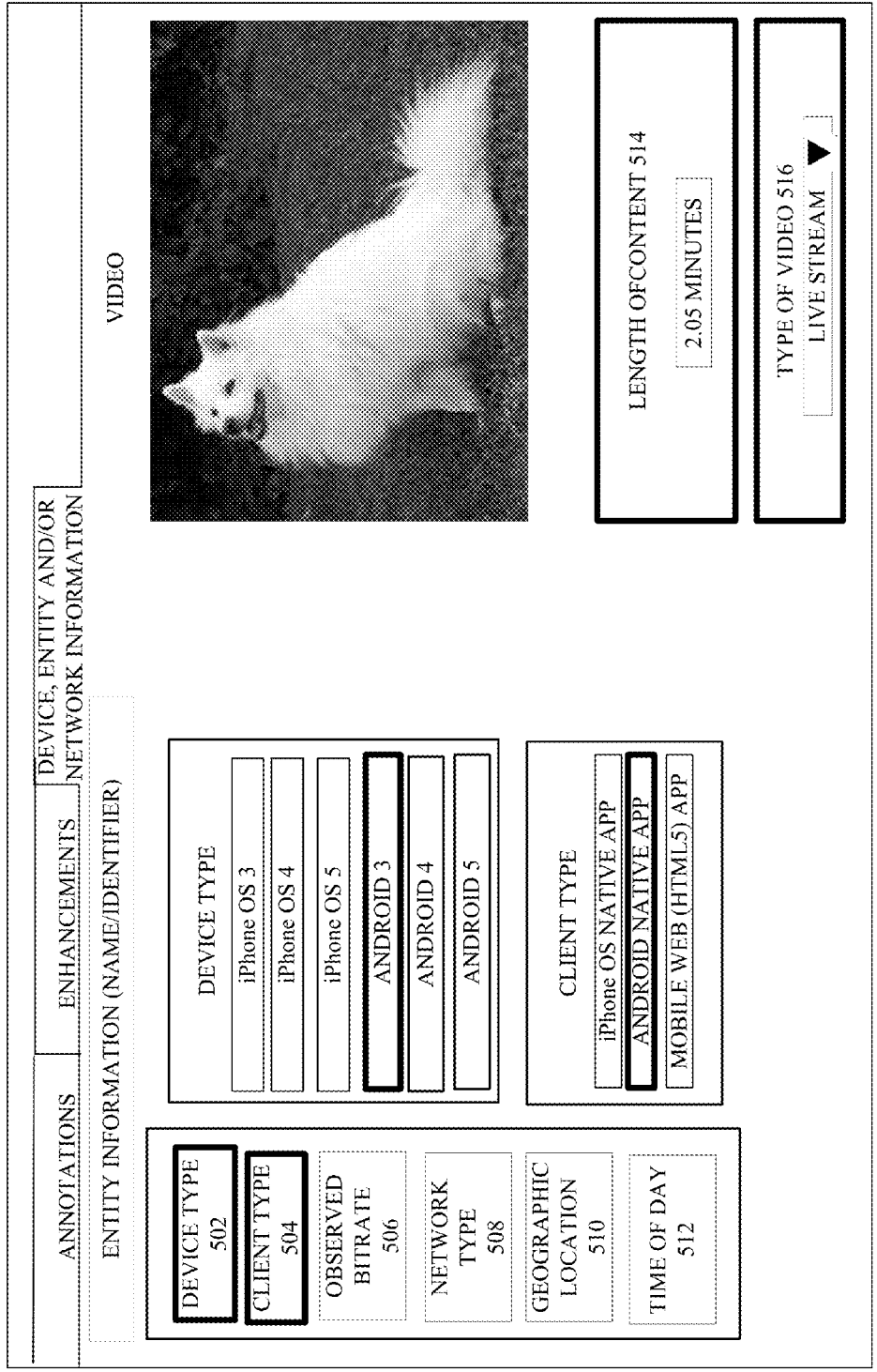
FIGS. 5, 6 and 7 are illustrations of non-limiting user interfaces that facilitate specification of values of device- or entity-related parameters for buffer wait time determination in accordance with one or more embodiments described herein.
Figure 6:
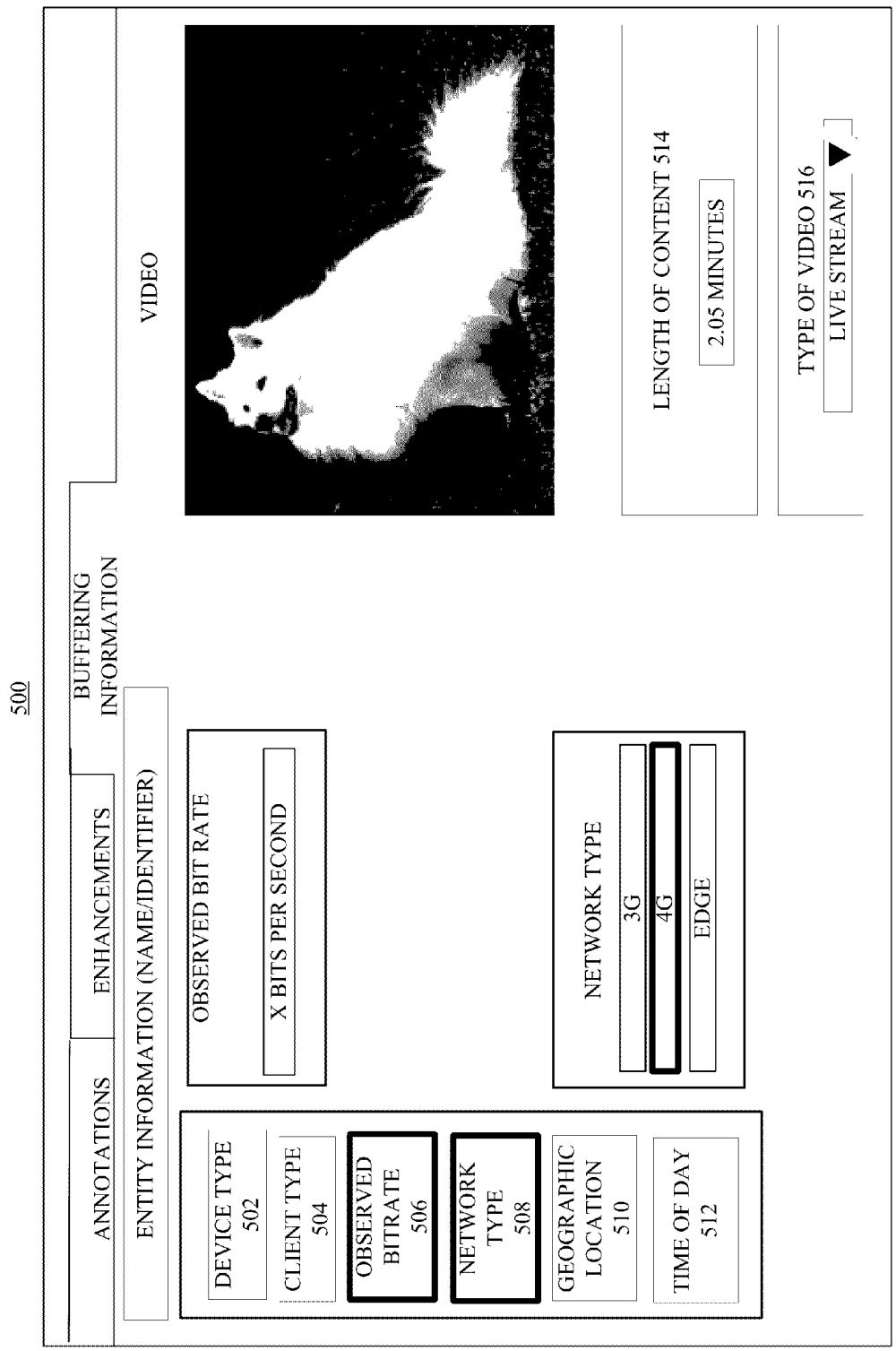
Figure 7:
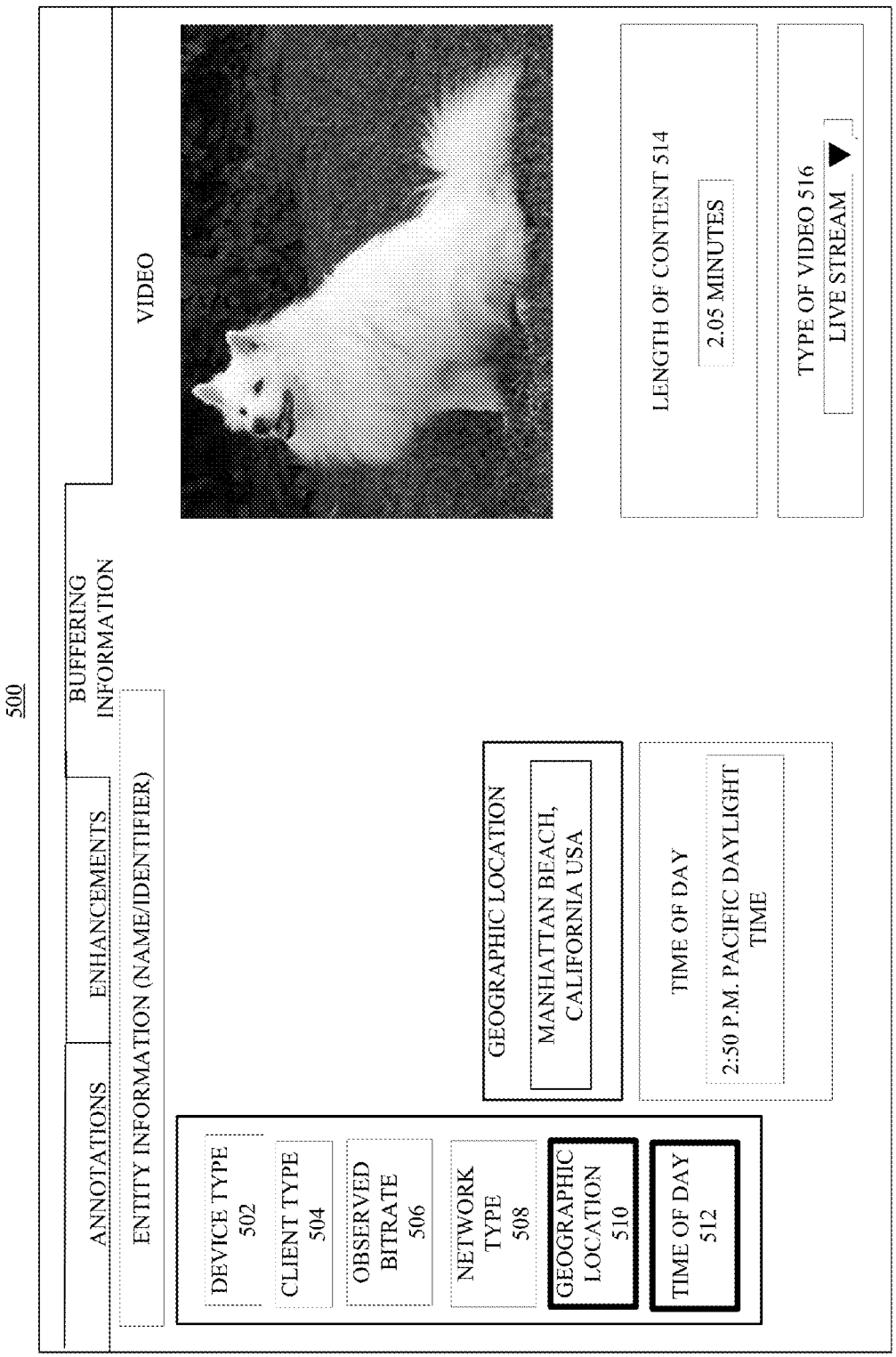

In either embodiment, values for the defined parameters can be specified, either before request for content 118, or contemporaneous with request for content 118, employing a user interface such as that shown in FIGS. 5, 6 and 7. FIGS. 5, 6 and 7 are illustrations of non-limiting user interfaces that facilitate specification of values of device- or entity-related parameters for buffer wait time determination in accordance with one or more embodiments described herein. Repetitive description of like elements employed in other embodiments described herein is omitted for sake of brevity.

User interface (UI) 500 can be generated by interface component 106 of FIG. 1 in some embodiments. In various embodiments, one or more portions of UI 500 can include a touch screen, one or more text boxes configured to receive input, one or more pull-down menus or buttons that can be toggled for selection of content and/or specification of one or more defined parameters for processing by buffer system 112 in determination of buffer control information including, but not limited to, buffer wait time. Any number of different approaches, arrangements or functionality can be employed via UI 500 to facilitate specification of values for the one or more defined parameters by device 102 and/or determination of buffer wait time by buffer system 112. FIGS. 5, 6 and 7 show three example embodiments of user interfaces.

As shown in FIGS. 5, 6 and 7, UI 500 can include a first display region 502 that provides an option for selection/specification of a device type, a second display region 504 that provides an option for selection/specification of client type, a third display region 506 that provides an option for selection/specification of a observed bit rate, a fourth display region 508 that provides an option for selection/specification of network type, a fifth display region 510 that provides an option for selection/specification of geographic location at which device 102 is located, a sixth display region 512 that provides an option for selection/specification of time of day at which the request for content 118 is being made, a seventh display region 514 that provides an option for selection/specification of length of content and/or an eighth display region 516 that provides an option for selection/specification of type of content 118.

Turning first to FIG. 5, first display region 502 can be selected to specify device type. The device type can be any number of different types of information that identifies a type of device including, but not limited to, a name or type of operating system of a device (e.g., iPhone Operating System (OS) 3, Android 3.0, Android 4.0), the processing speed of the device or the like. Shown are non-limiting examples. Such information can be employed by buffer system 112 to determine buffer wait time.

Second display region 504 can be selected to specify client type. For example, the type of native application associated with device 102 can be specified. As shown, in various embodiments, options that can be selected for the client type can include, but is not limited to, iPhone OS native application, Android native application and/or mobile web (HTML5) application.

As shown in FIG. 6, third display region 506 can be selected to specify the bit rate observed by device 102. In some embodiments, the bit rate observed by device 102 may be different from the bit rate promised by network 114 (or any other network to which device 102 is communicatively coupled). The observed bit rate can be specified as a number of bits or bytes per second in various embodiments.

Fourth display region 508 can be selected to specify network type. For example, the network type can include, but is not limited to, 3G network, 4G Long-Term Evolution (LTE) network, Enhanced Data rates for GSM Evolution (EDGE) network and/or wireless fidelity (Wi-Fi) network. In other embodiments, any number of other types of networks can be specified.

As shown in FIG. 7, fifth display region 510 can be selected to specify geographic location of device 102 and sixth display region 512 can be selected to specify time of day of content request. Geographic location can be specified by name of location and/or longitude/latitude parameters. Time of day can be specified in terms of day, evening, or specific numerical time (e.g., 9:00 am Pacific Daylight Time).

Seventh display region 514 can be selected to specify the length of the content requested by device 102 (e.g., longer than a defined threshold, shorter than a defined threshold, 2 minutes and 3 seconds). Eighth display region 516 can be selected to specify the type of content. For example, the content can be video on demand (VOD) or a live stream.

In some embodiments, the values for one or more of the defined parameters specified in the different display regions can be populated automatically based on detection of one or more conditions at device 102 by device 102. In these embodiments, an entity is not required to manually enter information at device 102 (for at least one or more of the defined parameters). For example, observed bit rate, device type, client type, length of video, time of day and/or geographical location of device can be automatically populated in some embodiments.

Turning back to FIG. 1, buffer system 112 can receive the values for the respective one or more defined parameters and determine a buffer wait time for the requested content at device 102. Buffer system 112 can cause buffer control information 120 to be transmitted to device 102, and buffering component 105 of device 102 can buffer content 118 for a defined amount of time. For example, buffer control information 120 can include buffer wait time that buffering component 105 should buffer prior to playback of content 118. In some embodiments, buffer control information 120 can be transmitted to device 102 by buffer system 112.

Accordingly, after request by device 102 for content 118, content 118 is received and at least a portion of content 118 is buffered in local memory of device 102. Content player component 104 can read content 118 out of local memory buffer for playback. Content 118 can be buffered in local memory buffer at device 102 for the buffering wait time, and buffering component 105 can control buffering of content 118 (prior to commencement of playback of content 118 and/or during pauses in playback of content 118) as specified by buffer wait time.

In other embodiments, buffer control information 120 can be transmitted to device 102 by content server 108 (e.g., in association with transmission of content 118 to device 102 by content server 108). For example, buffer wait time information can be transmitted in metadata associated with content 118.

In some embodiments, one or more buffer wait times can be received and/or stored at device 102 contemporaneous with receipt of content 118 at device 102. In other embodiments, one or more buffer wait times can be received and/or stored at device 102 after content 118 is provided to device 102 (e.g., for current use with content 118 and/or for use for later-requested content). In other embodiments, one or more buffer wait times can be received and/or stored at device 102 before content 118 is requested. For example, in some embodiments, one or more buffer wait times can be generated by buffer system 112 and received and/or stored at device 102 upon initialization of operation of device 102 and/or at any particular time during operation of device 102 (irrespective of whether device 102 has requested content for playback on device 102). Content 118 can be received by device 102, and device 102 can buffer content 118 as indicated by the buffer wait time indicated by buffer system 112.

Content server 108 can include hardware, software or a combination of hardware and software configured to deliver content accessed via network 114 (e.g., Internet). As such, content server 108 can receive requests for content 118 from device 102 and can deliver the requested content to device 102. Content 118 can be stored in content repository 110 in some embodiments in which content repository 110 is a separate entity from content server 108 and/or incorporated with content server 108.

Turning back to FIG. 1, network 114 can be or include a wired or wireless channel providing connectivity between two or more points. For example, network 114 can communicatively and/or electrically couple one or more of device 102, buffer system 112, content server 108 and/or content repository 110. By way of example, but not limitation, network 114 can be a cellular network, a wide area network (WAN) (e.g., Internet), a local area network (LAN), or a personal area network (PAN). Network 114 can utilize any number of different types of wired or wireless technology, including, for example, cellular, WAN, wireless fidelity (Wi-Fi), Wi-Max and/or WLAN. Although not shown, in some embodiments, one or more of buffer system 112, content server 108 and/or content repository 110 can be cloud-based systems.

Figure 2:
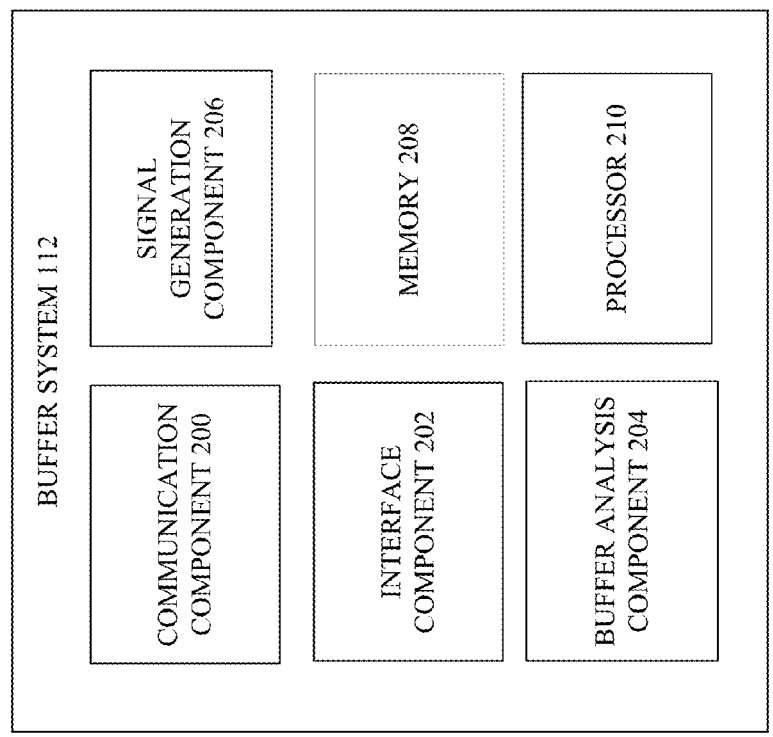
FIG. 2 is an illustration of a non-limiting block diagram of a buffer system of the system of FIG. 1 that facilitates buffer wait time determination based on device- or entity-related conditions in accordance with one or more embodiments described herein.
Figure 3:
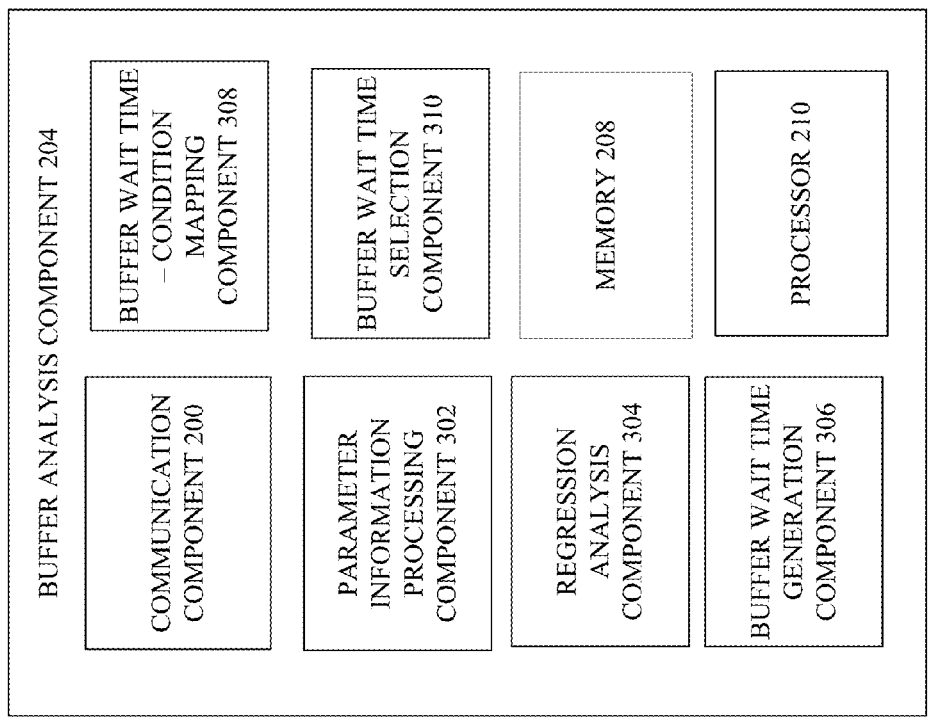
FIG. 3 is an illustration of a non-limiting block diagram of a buffer analysis component of the buffer system of FIG. 2 that facilitates buffer wait time determination based on device- or entity-related conditions in accordance with one or more embodiments described herein.

Buffer system 112 will be discussed in greater detail with reference to FIGS. 2, 3 and 4. FIG. 2 is an illustration of a non-limiting block diagram of a buffer system of the system of FIG. 1 that facilitates buffer wait time determination based on device- or entity-related conditions in accordance with one or more embodiments described herein. FIG. 3 is an illustration of a non-limiting block diagram of a buffer analysis component of the buffer system of FIG. 2 that facilitates buffer wait time determination based on device- or entity-related conditions in accordance with one or more embodiments described herein. FIG. 4 is an illustration of a non-limiting block diagram of a table of maximum buffer wait times for different conditions in accordance with one or more embodiments described herein. Repetitive description of like elements employed in other embodiments described herein is omitted for sake of brevity.

Turning first to FIG. 2, buffer system 112 can include communication component 200, interface component 202, buffer analysis component 204, buffer content component 206, memory 208 and/or processor 210. In various embodiments, one or more of communication component 200, interface component 202, buffer analysis component 204, buffer content component 206, memory 208 and/or processor 210 can be electrically and/or communicatively coupled to one another to perform one or more functions of buffer system 112.

Communication component 200 can transmit and/or receive information to/from content server 108, content repository 110 and/or device 102. For example, communication component 200 can receive information indicative of a request for content to be provided over network 114 to device 102 and/or indicative of values for one or more respective defined parameters associated with device 102, a network to which device 102 is associated and/or an entity associated with device 102. In some embodiments, with reference to FIGS. 1 and 2, the information indicative of the request for content 118 can be received at communication component 200 from content server 108, for example, after content server 108 receives the request from device 102 for content 118.

Communication component 200 can transmit buffer control information, including, but not limited to, buffer wait time (or an indicator of a buffer wait time). For example, in some embodiment, buffer wait time can be a number of seconds for which content 118 should be buffered by device 102 prior to commencement of playback of content 118 or during a pause in playback of content 118.

Interface component 202 can generate one or more user interfaces similar to that shown with reference to FIGS. 5, 6 and 7 in various embodiments. However, the interfaces can be displayed at buffer system 112 in embodiments in which buffer system 112 is accessible for direct receipt of values for one or more defined parameters for a device (or entity associated with a device). In this regard, in lieu of transmitting the values over a network from a device to communication component 200, an entity (e.g., user) can input the values directly at/on buffer system 112.

Buffer analysis component 204 can receive and/or process information indicative of one or more defined parameters and/or values for respective one or more defined parameters. Buffer analysis component 204 can determine or select buffer wait time for device 102 for buffering content 118 prior to or during playback of content 118.

As such, in some embodiments, buffer wait time can be entity-specific (and thereby remain constant for the entity irrespective of the device employed for playback of content) and/or buffer wait time can be device-specific (and thereby remain constant for the device irrespective of the entity associated with the device).

In other embodiments, buffer analysis component 204 can compute a new buffer wait time specifically tailored to and taking into account one or more different values of the defined parameters. In these embodiments, changing any values can possibly result in a new buffer wait time.

Buffer analysis component 204 can update buffer wait times based on determining that one or more values of defined parameters has changed and/or generally from time to time based on changes in the network loading, infrastructure or the like.

Buffer analysis component 204 will be described in greater detail with reference to FIGS. 3 and 4. As shown, buffer analysis component 204 includes communication component 200, parameter information processing component 302, regression analysis component 304, buffer wait time generation component 306, buffer wait time condition mapping component 308, buffer wait time selection component 310, memory 208 and/or processor 210. In various embodiments, one or more of communication component 200, parameter information processing component 302, regression analysis component 304, buffer wait time generation component 306, buffer wait time condition mapping component 308, buffer wait time selection component 310, memory 208 and/or processor 210 can be electrically and/or communicatively coupled to one another to perform one or more functions of buffer analysis component 204.

Parameter information processing component 302 can receive and/or process values for one or more defined parameters. In various embodiments, the one or more defined parameters include, but are not limited to, the type of device on which content will be played, a type of client for a device on which content will be played, a type of network connection for the device that will play the content, a geographical location of the device, a type of content or a length of content. In some embodiments, parameter information processing component 302 can store, evaluate and/or compare the values for one or more defined parameters. For example, in some embodiments, parameter information processing component 302 can store the values for one or more defined parameters as shown in FIG. 4. Corresponding buffer wait times generated by buffer analysis component 204 of buffer system 112 can be also stored. The table can be a look-up table that can be accessed by buffer system 112 upon determination that content has been requested for playback of a device having various conditions indicated by one or more of the values for the defined parameters. As shown, the buffer wait time can vary by the values of the parameters (or the combination of values of the parameters) such that different values, or different combinations of values, can be associated with different buffer wait times.

Turning back to FIG. 3, buffer wait time generation component 306 can generate one or more buffer wait times for one or more defined parameters. For example, buffer wait time generation component 306 can generate buffer wait times from the output of regression analysis component 304 in some embodiments. For example, buffer wait time generation component 306 can generate a plurality of candidate buffer wait times as a function of respective levels of experiences. Buffer wait time selection component 310 can select a buffer wait time from the plurality of candidate buffer wait times.

For example, for a set of defined parameters, regression analysis component 304 can estimate the relationship between a set of defined parameters and a resultant user experience level. For example, a first set of defined parameters can result in an estimation of a first user experience level while a second set of defined parameters (that are different from the first set of defined parameters) can result in a second user experience level. Regression analysis component 304 can model the relationship between the values of the set of defined parameters and the user experience level, and, based on the model, predict user experience level for different values of sets of defined parameters.

In some embodiments, buffer wait time generation component 306 can combine information indicative of values for one or more defined parameters. For example, buffer wait time generation component 306 can combine values for defined parameters such as those related to the session initiated by device 102 (e.g., time of day, geographical location from which session originates), those related to entity information (e.g., age, gender, those related to historical information regarding likelihoods of abandonment of content for respective buffer wait times), those related to type of device 102, those related to network type for device 102 or the like to determine a value of buffer wait time (or maximum buffer wait time) that maximizes watch time of content 118 or equals or exceeds a defined likelihood that abandonment will not occur. In various embodiments, one or more different buffer wait times can be generated for one or more different sets of values for the defined parameters.

In one embodiment, buffer wait time generation component 306 can determine an optimal buffer wait time by performing an experiment with a set of entities. The experiment can include assigning random buffer wait times between a first number of seconds and a second number of seconds (e.g., between 0 seconds and 20 seconds) to the entities for different content.

The abandonment rate can be input into a machine learning algorithm that can output an optimal buffer wait time for a given combination of defined parameters (or values of defined parameters). The optimal buffer wait time can be the buffer wait time at which the fewest number of entities abandon the content assigned to the entities. Abandonment can occur before playback of the content or during a pause after playback has commenced. The machine learning algorithm can be performed by regression analysis component 304 of buffer analysis component 204 in some embodiments.

In some embodiments, regression analysis component 304 can employ polynomial regression to identify optimal buffer wait times. A formula can be produced that can be used to calculate buffer wait times.

After data acquisition (e.g., acquisition of abandonment rate and/or one or more optimal buffer wait times), in one embodiment, a formula can be generated that uses the values of the defined parameters (e.g., time of day, type of content, type of device) as input parameters and that outputs the buffer wait time as the result of the formula.

In another embodiment, a look-up table can be keyed by the values of one or more of the defined parameters. Accordingly, one or more of the defined parameters can be inserted into the variables in the look up table and a buffer wait time can be determined.

In some embodiments, the buffer wait times can be computed client side (e.g., at device 102) or server side (e.g., at buffer system 112). In embodiments in which buffer wait times are computed server side, one or more of the buffer wait times can be transmitted to device 102 with the content and/or with metadata about the requested content. Accordingly, the content metadata can be provided to device 102 and, in addition to the content metadata, the buffer wait time information can also be provided to device 102.

In various embodiments, a buffer wait time can be determined and provided on a per entity basis, per device basis, per channel basis and/or per individual content request. In one embodiment, buffer system 112 can determine the buffer wait time by calibrating the buffer wait time to be equal to the maximum time an entity will wait for content to buffer before abandoning the content. An approximation can be determined by analyzing average time to abandonment information in logs, for example.

In some embodiments, an entity watching a video on an older model phone is likely to be accustomed to waiting longer for content to load, given the limited hardware and lack of faster network connection on older phones. However, other conditions can affect entity expectation, which can affect the optimal buffer wait time for the entity.

In another example, an entity in a developing country may be more willing to tolerate a longer join time because of the expectation of how much time should pass while content is loaded. By contrast, an entity in a developed country, which is likely to be more accustomed to shorter wait times, given the more constant availability of services, social networks, etc., is likely to be less tolerate of a longer join time. In the case of the entity in the developed country, a longer maximum buffer wait time can be employed to cause a lower buffer ratio after playback.

In some embodiments, geographic location can be employed to worldwide location of device 102 and/or proximity to content server 108. Time of day can be employed in the event that upstream congestion is the cause of the content buffer delay. Length of video can be employed to determine the amount of time for buffer wait time also. For example, a short video might buffer for enough time that the whole video will play without pause while a long video might only buffer for enough time that the entity can view (or the video can play) the first 2 minutes before pausing. With regard to type of video, the video can either be a live stream or a video on demand (VOD). VOD can have longer buffer wait times than live streams of video.

In some embodiments, one or more bandwidth factors can be combined with historical data (e.g. previous measurements of actual bits per second (bps) of bandwidth and the actual values of the bandwidth factors) to generate an estimate of bits per second of bandwidth. For example, regression analysis component 304 can perform regression analysis over historical data to produce a linear combination of historical bandwidth factors to estimate the current bps of bandwidth.

As another example, one or more bandwidth factors can be assigned a weight, which when multiplied with the respective bandwidth factors and summed, produces an estimate for the current bps of bandwidth. The weight values could be stored in a look-up table that can be updated each time the estimating process runs. In some embodiments, the estimate of bps of bandwidth can be combined with the bps of the content to determine a buffer wait time. For instance if the estimated bandwidth is 1000 bps (based on the bandwidth factors and historical data), and the content plays at 2000 bps, the amount of time to download one second of content is 2000/1000=2 seconds. If the length of the buffer at device 102 is 10 seconds, the buffer wait time can be computed as 10*2=20 seconds. Thus, in some embodiments, the buffer wait time can be computed by buffer analysis component 204 as equal to (or approximately equal to) the estimated bandwidth content playback rate×length of device 102 buffer.

In some embodiments, buffer ratio can be computed as the total buffer wait time for content divided by the total time of playback of the content. In some embodiments, device 102 can estimate buffer wait time. For example, device 102 can send the device buffer wait time and/or a device buffer ratio to content server 108 and/or buffer system 112. In another example, content server 108 and/or buffer system 112 can optionally, based on one or more criteria (e.g., network congestion, data center overload, and network topology changes (e.g., traffic is normally served to client in Asia from an Asian data center, but perhaps the data center in Asia is down and the traffic is served from North America instead leading to longer buffer times), or any other suitable factor), override the device buffer wait time and/or the device buffer ratio from device 102 and employ a buffer wait time and/or a buffer ratio determined by buffer system 112. Furthermore, buffer system 112 can employ a previously-determined buffer wait time and/or buffer ratio for device 102 until a new buffer wait time and/or buffer ratio for device 102 is determined.

In one embodiment, the additional information can be sent in quality of experience messages. Regression analysis component can then tweak the maximum buffer wait time value, and use a polynomial regression to identify patterns in what defined parameters affect user watch time for various groups of users. The users can be groups by having similar defined parameters and/or characteristics. If a user watch time can be improved with a user-specific maximum buffer wait time value, then that specific maximum buffer wait time value can be provided to content player component 104 of device 102.

After storing one or more buffer wait times, in some embodiments, the set of one or more buffer wait times will represent each possible permutation of the values that can be input or selected for the defined parameters, or bandwidth factors.

A set of data with buffer wait time (or maximum buffer wait time) can be the independent variable and user watch time can be the dependent variable. In some embodiments, user watch time can be measured as the total time duration of content watched during the course of gathering the set of buffer wait times (or maximum buffer wait time values). Regression analysis component 304 can then do a series of regression analyses and determine a regression technique that best models the data (e.g., relationship between values of one or more defined parameters and user watch time).

In some embodiments, a polynomial regression method can be employed. In other embodiments, any number of other different types of regression models can be employed. The model can be employed by buffer wait time generation component 306 to determine an optimal value for buffer wait time by finding the value of buffer wait time that results in the peak user watch time on the regression curve generated by regression analysis component 304. In some embodiments, the regression curve is an inverse parabola and the peak is the point at which the derivative crosses the zero value, for example.

Once calculated, the optimal buffer wait time for each permutation of values of defined parameters can be stored (e.g., stored in table 400), and returned to content player component 104 for use during playback of content 118. In some embodiments, table 400 is stored at content repository, buffer system 112 and/or content server 108. In other embodiments, table 400 is stored at device 102. In some embodiments, portions of table 400 having characteristics matching those of device 102 can be stored. For example, in embodiments, in which device 102 is an Android 3 device type, only buffer wait times corresponding to those for which Android 3 is the device type can be sent to device 102.

Accordingly, in some embodiments, one or more buffer wait times can be received by device 102 upon each request of content. In other embodiments, one or more buffer wait times can be provided to device 102 and stored at device 102 for subsequent access and use to determine buffer wait times or maximum buffer wait times upon request of other content that is requested later in time after receipt and storage of one or more buffer wait times at device 102.

In various embodiments, regression analysis component 304 can perform one or more methods based on machine learning processes to model the relationship. In one embodiment, regression analysis component 304 can perform supervised leaning to infer a function training data. For example, training data can include, but is not limited to, one or more different values of defined parameters that can be received in association with a request to playback content at a device and corresponding user experience levels that resulted. Based on this training data, regression analysis component 304 can infer a function that can then be employed for mapping sets of defined parameters that are subsequently received. Buffer wait time generation component 306 can generate one or more buffer wait times from the function output from regression analysis component 304.

Buffer wait time condition mapping component 308 can associate and/or map the buffer wait time generated for one or more defined parameters with the one or more defined parameters. In some embodiments, buffer wait time condition mapping component 308 can associate the buffer wait time with an entity associated with a device, with a device that will playback content and/or with a type of network. In some embodiments, buffer wait time condition mapping component 308 can generate table 400 of FIG. 4 (or information indicative of that shown in table 400).

In some embodiments, regression analysis component 304 can determine and/or quantify the strength of the relationship between values for particular defined parameters and the user experience level. Regression analysis component 304 can determine which values and/or which conditions have no relationship to user experience level and/or which subsets of values or defined parameters are subsets of others and therefore include only redundant information (that does not need to be considered if the other defined parameter is considered).

Buffer wait time selection component 310 can select a buffer wait time from one or more buffer wait times. For example, the one or more buffer wait times can be stored in a repository such as in the form of table 400 of FIG. 4. Buffer wait time selection component 310 can select the buffer wait time based on an evaluation of one or more defined parameters. For example, in some embodiments, buffer wait time selection component 310 can review a look-up table of buffer wait times for different conditions. Buffer wait time selection component 310 can select a buffer wait time that meets a defined parameter and/or that is provided for one or more defined parameters that match current conditions for device 112.

In some embodiments, buffer wait time selection component 310 can select a buffer wait time that corresponds to a defined level of experience for a user. For example, the user can specify particular latency requirements and the buffer wait time selection component 310 can select a buffer wait time that meets the latency requirements.

In another embodiment, buffer wait time selection component 310 can select a buffer wait time that meets one or more other conditions specified by the user and/or in connection with device 102.

Turning back to FIG. 2, signal generation component 206 can generate a signal that is employed by device 102 for buffering content 118 for the buffer wait time. In some embodiments, the signal includes information indicative of the buffer wait time. The information can be included in metadata of content 118 in some embodiments or in a message separate from content 118 in other embodiments.

Memory 208 can be a computer-readable storage medium storing computer-executable instructions and/or information for performing the functions described herein with reference to buffer system 112 (or any component of buffer system 112). For example, memory 208 can store computer-executable instructions that can be executed by processor 210 to perform communication, evaluation, decision-making or other types of functions executed by buffer system 112. Processor 210 can perform one or more of the functions described herein with reference to secure content system 106. For example, processor 210 can determine one or more buffer wait times, select from amongst a plurality of candidate buffer wait times, perform regression analysis, process values of one or more defined parameters or the like.

Turning back to FIG. 1, in some embodiments, device 102 can select a buffer wait time stored at or accessible to device 102, and previously-generated by buffer system 112. For example, device 102 can identify one or more values for respective one or more defined parameters associated with device 102 and/or an entity associated with device 102. Device 102 can determine a buffer wait time for playback of content on the device based on the one or more values one or more defined parameters. For example, device 102 can employ a look-up table including one or more buffer wait times and corresponding values for the one or more defined parameters.

Device 102 can then request content 118, and buffer content 118 upon receipt for the amount of time indicated by buffer wait time. In embodiments in which content 118 is stored on device 102, device 102 can simply buffer content 118 and begin playback (or resume playback if playback has commenced and buffering is being performed during a pause in playback).

As noted herein, buffer wait time is determined by values of one or more defined parameters. For example, device 102 can select a first value for the buffer wait time based on determining that the type of content for playback is a first type, and select a second value for the buffer wait time based on determining that the type of content for playback is a second type. As another example, device 102 can select a first value for the buffer wait time based on determining that the entity is located in a first geographic region, and select a second value for the buffer wait time based on determining that the entity is located in a second geographic region. As another example, device 102 can select a first value for the buffer wait time based on determining that the device is connected to a first type of network, and select a second value for the buffer wait time based on determining that the device is connected to a second type of network.

As another example, device 102 can select a first value for the buffer wait time based on determining that a type of the device is a first type, and select a second value for the buffer wait time based on determining that a type of the device is a second type, wherein the first value is different from the second value.

Figure 8:
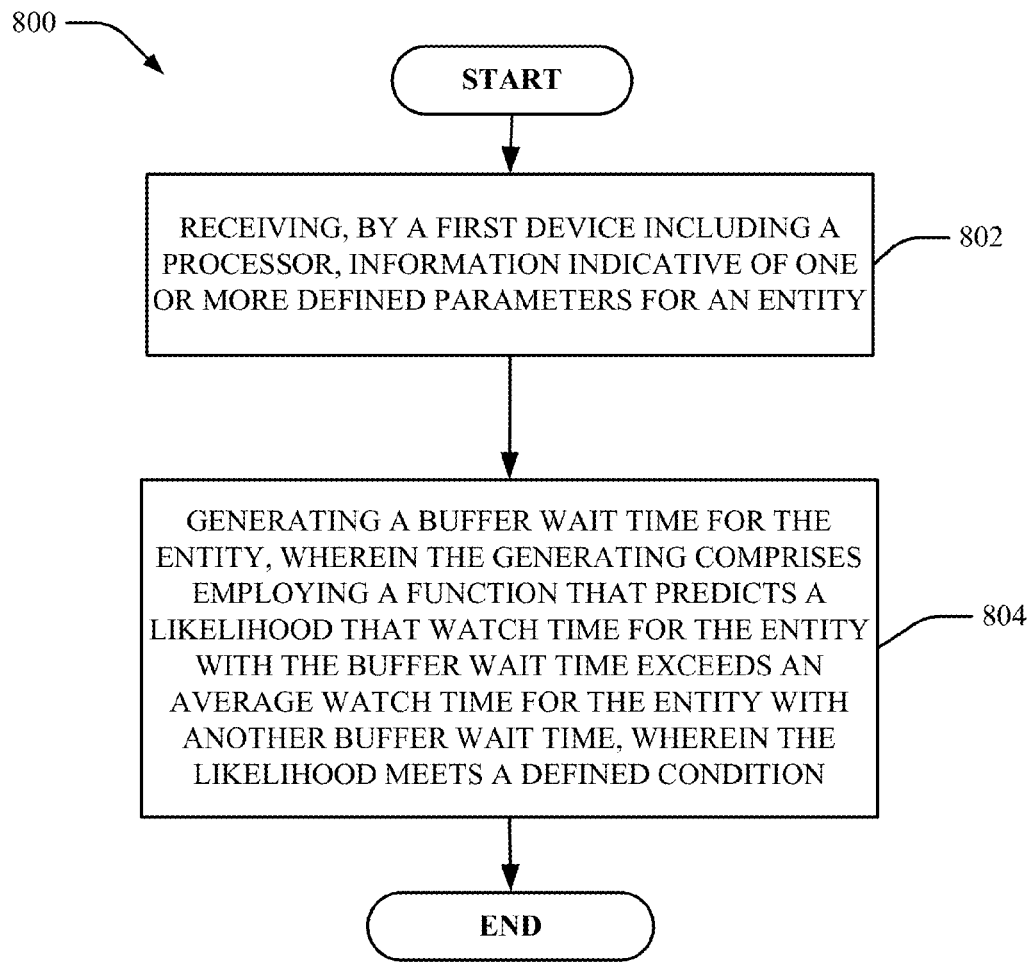
FIGS. 8, 9, 10 and 11 are illustrations of non-limiting flow diagrams of methods that facilitate buffer wait time determination based on device- or entity-related conditions in accordance with one or more embodiments described herein.

FIGS. 8, 9, 10 and 11 are illustrations of non-limiting flow diagrams of methods that facilitate buffer wait time determination based on device- or entity-related conditions in accordance with one or more embodiments described herein. Turning first to FIG. 8, at 802, method 800 can include receiving, by a first device including a processor, information indicative of one or more defined parameters for an entity (e.g., using parameter information processing component 302). At 804, method 800 can include generating a buffer wait time for the entity, wherein the generating comprises employing a function that predicts a likelihood that watch time for the entity with the buffer wait time exceeds an average watch time for the entity with another buffer wait time, wherein the likelihood meets a defined condition (e.g., using buffer wait time generation component 306).

Figure 9:
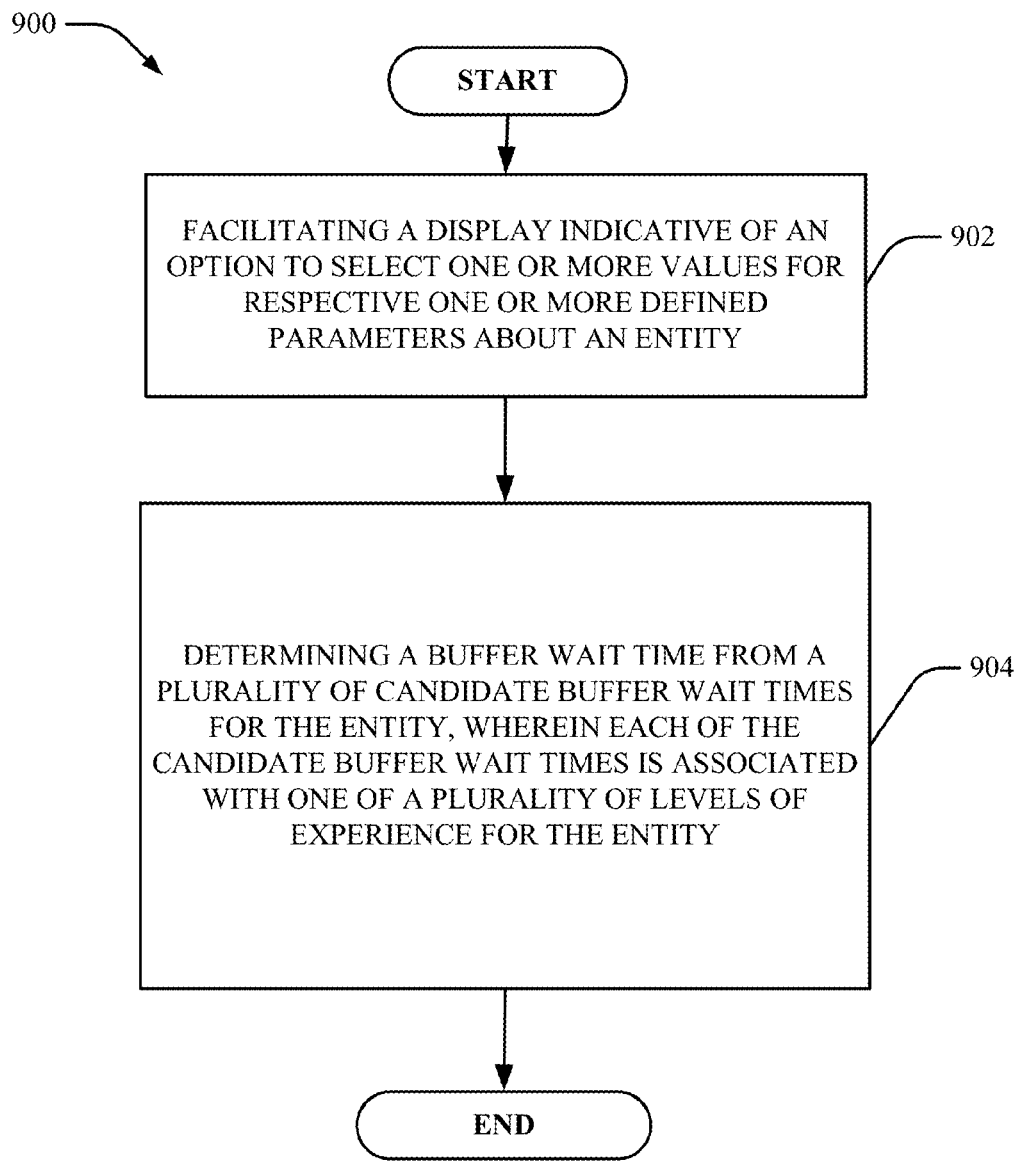

Turning now to FIG. 9, at 902, method 900 can include facilitating a display indicative of an option to select one or more values for respective one or more defined parameters about an entity (e.g., using interface component 202). At 904, method 900 can include determining a buffer wait time from a plurality of candidate buffer wait times for the entity, wherein each of the candidate buffer wait times is associated with one of a plurality of levels of experience for the entity (e.g., using buffer analysis component 204).

Figure 10:
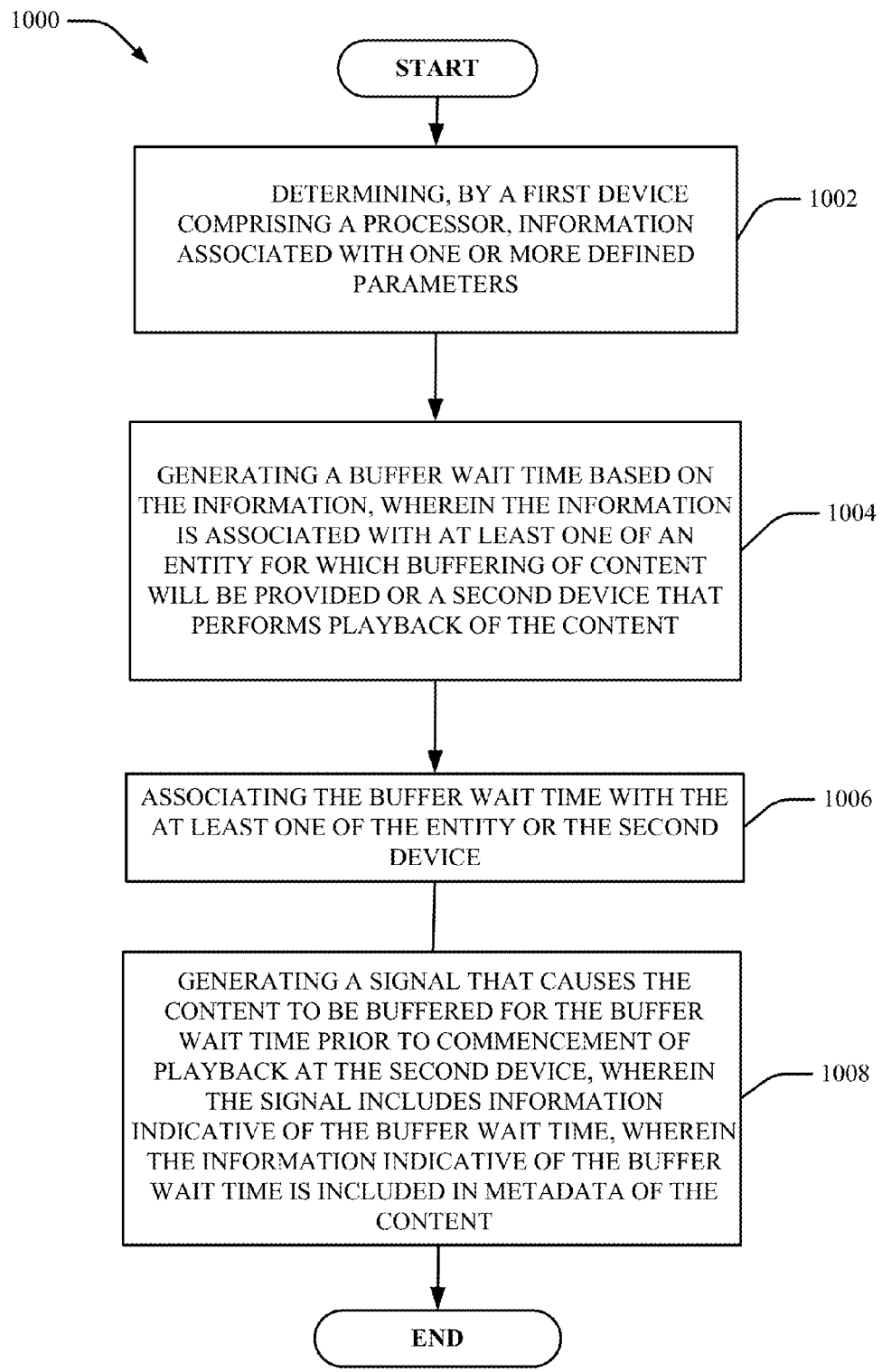

Turning now to FIG. 10, at 1002, method 1000 can include determining, by a first device including a processor, information associated with one or more defined parameters (e.g., using parameter information processing component 302). In some embodiments, the one or more defined parameters include at least one of a type of the second device, a type of connection for the second device with which the entity is associated or a geographical location of the second device.

At 1004, method 1000 can include generating a buffer wait time based on the information, wherein the information is associated with at least one of an entity for which buffering of content will be provided or a second device that performs playback of the content (e.g., using buffer wait time generation component 306).

At 1006, method 1000 can include associating the buffer wait time with the at least one of the entity or the second device (e.g., using buffer wait time—condition mapping component 308). At 1008, method 1000 can include generating a signal that is employed by the second device for buffering the content for the buffer wait time prior to commencement of playback at the second device. In some embodiments, the signal includes information indicative of the buffer wait time. The information can be included in metadata of the content received by the second device, in some embodiments (e.g., using signal generation component 206).

Figure 11:
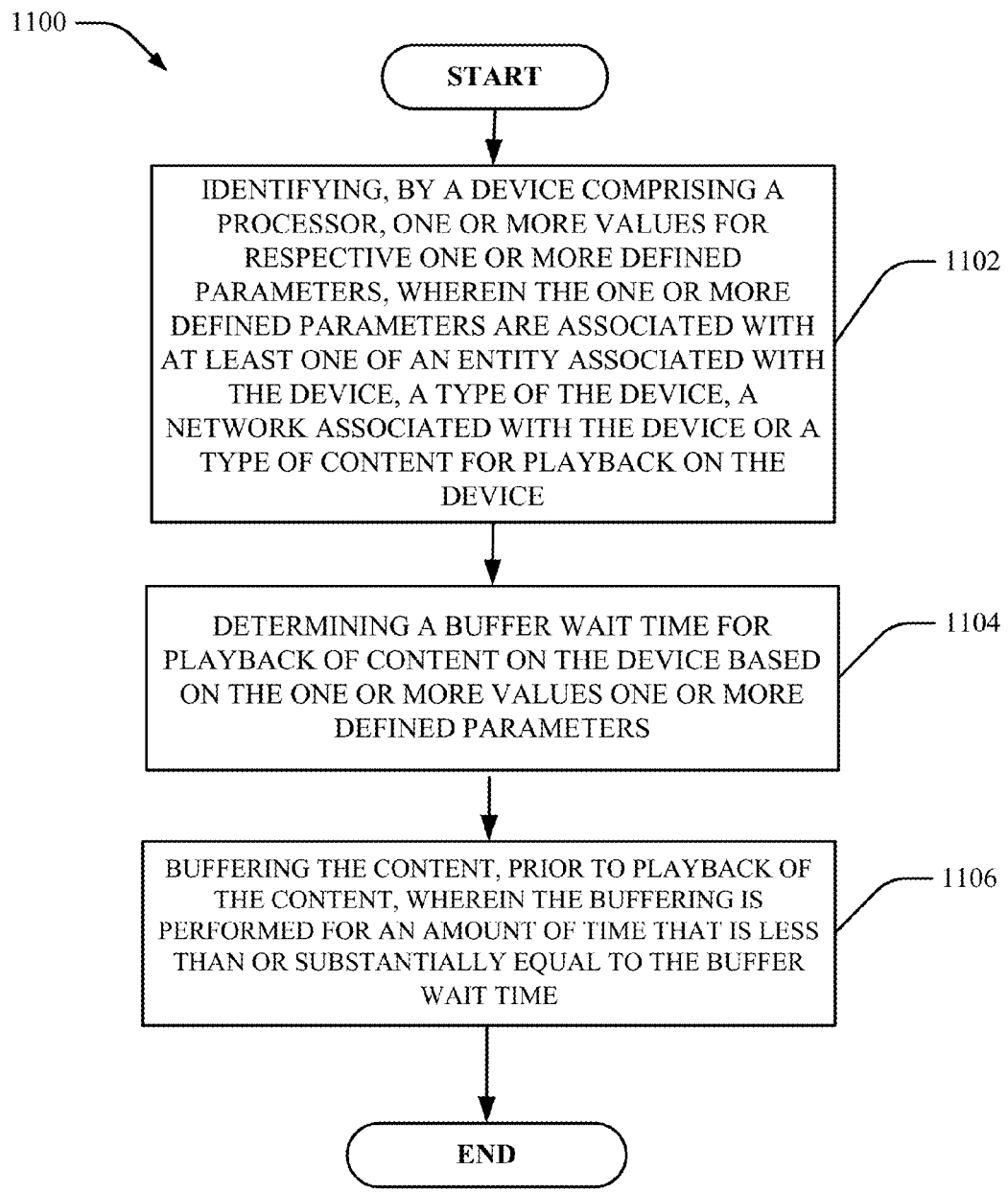

Turning now to FIG. 11, at 1102, method 1100 can include identifying, by a device including a processor, one or more values for respective one or more defined parameters, wherein the one or more defined parameters are associated with at least one of an entity associated with the device, a type of the device, a network associated with the device or a type of content for playback on the device (e.g., using device 102). In some embodiments, a defined parameter can include a type of content (e.g., live streaming content).

At 1104, method 1100 can include determining a buffer wait time for playback of content on the device based on the one or more values one or more defined parameters (e.g., using device 102). In some embodiments, determining the buffer wait time includes selecting the buffer wait time from a plurality of buffer wait times stored in a look-up table at the device.

In one embodiment, selecting includes: selecting a first value for the buffer wait time based on determining that the type of content is a first type; and selecting a second value for the buffer wait time based on determining that the type of content is a second type, wherein the first value is different from the second value.

In another embodiment, selecting includes: selecting a first value for the buffer wait time based on determining that the entity is located in a first geographic region; and selecting a second value for the buffer wait time based on determining that the entity is located in a second geographic region, wherein the first value is different from the second value.

In another embodiment, selecting includes: selecting a first value for the buffer wait time based on determining that the device is connected to a first type of network; and selecting a second value for the buffer wait time based on determining that the device is connected to a second type of network, wherein the first value is different from the second value.

In another embodiment, selecting includes: selecting a first value for the buffer wait time based on determining that a type of the device is a first type; and selecting a second value for the buffer wait time based on determining that a type of the device is a second type, wherein the first value is different from the second value.

At 1106, method 1100 can include buffering the content, prior to playback of the content, wherein the buffering is performed for an amount of time that is less than or substantially equal to the buffer wait time (e.g., using device 102).

Example Operating Environments

Figure 12:
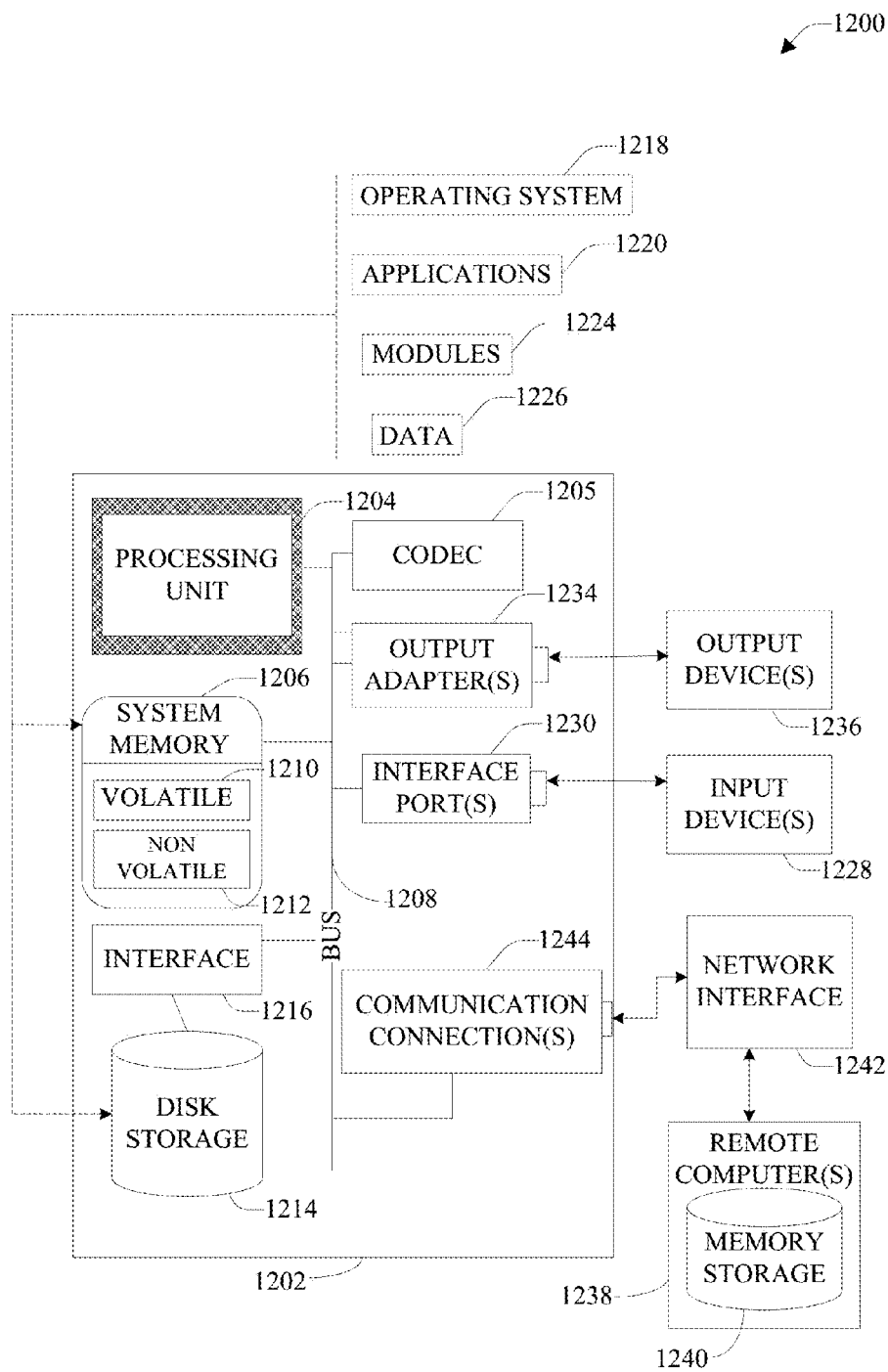
FIG. 12 is an illustration of a schematic diagram of a non-limiting operating environment for implementing one or more embodiments described in this disclosure.

FIG. 12 is an illustration of a schematic diagram of a non-limiting operating environment for implementing one or more embodiments described in this disclosure.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

With reference to FIG. 12, a suitable environment 1200 for implementing various embodiments described herein is or can include a computer 1202. The computer 1202 includes a processing unit 1204, a system memory 1206, a codec 1205, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1206 includes volatile memory 1210 and non-volatile memory 1212. The basic input/output system (BIOS), containing the basic routines to transfer information between elements within the computer 1202, such as during start-up, is stored in non-volatile memory 1212. In addition, according to one or more embodiments, codec 1205 may include at least one of an encoder or decoder, wherein the at least one of an encoder or decoder may consist of hardware, a combination of hardware and software, or software. Although, codec 1205 is depicted as a separate component, codec 1205 may be contained within non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), or flash memory. Volatile memory 1210 includes random access memory (RAM), which acts as external cache memory. According to present aspects, the volatile memory may store the write operation retry logic (not shown in FIG. 12) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1202 may also include removable/non-removable, volatile/non-volatile computer storage medium. FIG. 12 illustrates, for example, disk storage 1214. Disk storage 1214 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1214 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1214 to the system bus 1208, a removable or non-removable interface is typically used, such as interface 1216.

It is to be appreciated that FIG. 12 describes software that acts as an intermediary between users and the basic computer resources described in the suitable operating environment 1200. Such software includes an operating system 1218. Operating system 1218, which can be stored on disk storage 1214, acts to control and allocate resources of the computer 1202. Applications 1220 take advantage of the management of resources by operating system 1218 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228. Input devices 1228 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s). Thus, for example, a USB port may be used to provide input to computer 1202, and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output device 1236 and the system bus 1208. It should be noted that other devices and/or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

Figure 13:
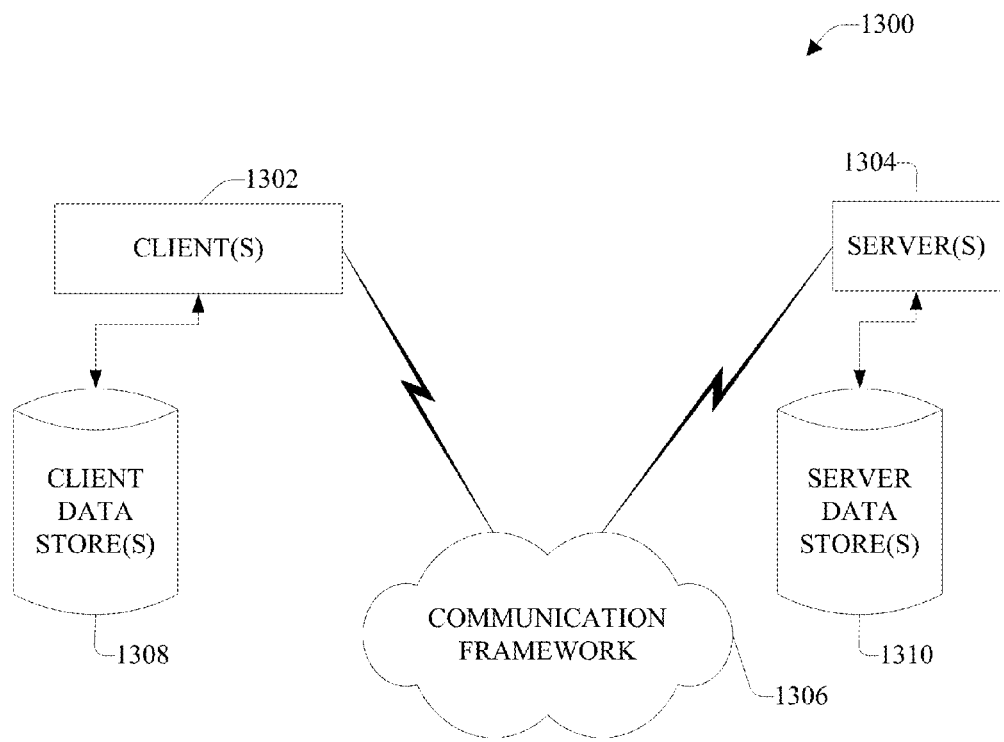
FIG. 13 is an illustration of a schematic diagram of a non-limiting computing environment for implementing one or more embodiments described in this disclosure.

FIG. 13 is an illustration of a schematic diagram of a non-limiting computing environment for implementing one or more embodiments described in this disclosure. Referring now to FIG. 13, there is illustrated a schematic block diagram of a computing environment 1320 for implementation of one or more embodiments described herein. The system 1320 includes one or more client(s) 1302 (e.g., laptops, smart phones, PDAs, media players, computers, portable electronic devices, tablets, and the like). The client(s) 1302 can be hardware and/or software (e.g., threads, processes, computing devices). The system 1300 also includes one or more server(s) 1304. The server(s) 1304 can also be hardware or hardware in combination with software (e.g., threads, processes, computing devices). The servers 1304 can house threads to perform transformations by employing aspects of this disclosure, for example. One possible communication between a client 1302 and a server 1304 can be in the form of a data packet transmitted between two or more computer processes wherein the data packet may include video data. The data packet can include a metadata, e.g., associated contextual information, for example. The system 1300 includes a communication framework 1308 (e.g., a global communication network such as the Internet, or mobile network(s)) that can be employed to facilitate communications between the client(s) 1302 and the server(s) 1304.

Communications can be facilitated via a wired (including optical fiber) and/or wireless technology. The client(s) 1302 include or are operatively connected to one or more client data store(s) 1310 that can be employed to store information local to the client(s) 1302 (e.g., associated contextual information). Similarly, the server(s) 1304 are operatively include or are operatively connected to one or more server data store(s) 1310 that can be employed to store information local to the servers 1304.

In one embodiment, a client 1302 can transfer an encoded file, in accordance with the disclosed subject matter, to server 1304. Server 1304 can store the file, decode the file, or transmit the file to another client 1302. It is to be appreciated, that a client 1302 can also transfer uncompressed file to a server 1304 and server 1304 can compress the file in accordance with the disclosed subject matter. Likewise, server 1304 can encode video information and transmit the information via communication framework 1308 to one or more clients 1302.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the one or more of the embodiments described herein. Furthermore, it can be appreciated that many of the various components can be implemented on one or more IC chips. For example, in one embodiment, a set of components can be implemented in a single IC chip. In other embodiments, one or more of respective components are fabricated or implemented on separate IC chips.

What has been described above includes examples of the embodiments. It is, of course, not possible to describe every conceivable combination of components or methodologies for purposes of describing the claimed subject matter, but it is to be appreciated that many further combinations and permutations of the embodiments are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that one or more embodiments includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular aspect of an embodiment may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
    a memory storing computer executable components; and
    a processor configured to execute the following computer executable components stored in the memory:
        an interface component that:
            facilitates a display indicative of an option to select one or more values for respective one or more defined parameters about an entity; and
        a buffer analysis component that:
            determines a buffer wait time from a plurality of candidate buffer wait times for the entity, wherein each of the candidate buffer wait times is associated with one of a plurality of levels of experience for the entity related to a rate of abandonment of content assigned to the entity prior to or during playback of the content.

2. The system of claim 1, wherein the buffer analysis component also performs regression analysis employing the one or more values for the respective one or more defined parameters and the plurality of levels of experience for the entity.

3. The system of claim 2, wherein the buffer analysis component determines a function that characterizes a relationship between the values for the respective one or more defined parameters and the plurality of levels of experience.

4. The system of claim 1, wherein the one or more defined parameters comprise at least one of a type of a device associated with the entity, a type of connection for a device with which the entity is associated or a geographical location of the device.

5. The system of claim 1, wherein the system further comprises:
    a communication component that transmits, to a device associated with the entity, a message including information indicative of the buffer wait time.

6. A method, comprising:
receiving, by a first device comprising a processor, information indicative of one or more defined parameters for an entity; and
generating a buffer wait time for the entity, wherein the generating comprises employing a function that predicts a likelihood that watch time for the entity with the buffer wait time exceeds an average watch time for the entity with another buffer wait time, wherein the likelihood meets a defined condition, and wherein the buffer wait time is associated with a level of experience for the entity related to a rate of abandonment of content assigned to the entity prior to or during playback of the content.

7. The method of claim 6, wherein the one or more defined parameters comprise the determined buffer wait time being a maximum buffer wait time that provides the level of experience for the entity that is equal to a defined value.

8. The method of claim 6, wherein the one or more defined parameters are associated with at least one of user biographical information or user preference information.

9. The method of claim 6, wherein the one or more defined parameters are associated with resources of a second device, and wherein the entity is associated with the second device.

10. The method of claim 6, wherein the one or more defined parameters are associated with a geographical location of the entity.

11. A method, comprising:
determining, by a first device comprising a processor, information associated with one or more defined parameters; and
generating a buffer wait time based on the information, wherein the information is associated with at least one of an entity for which buffering of content will be provided or a second device that performs playback of the content, and wherein the buffer wait time is associated with a level of experience for the entity related to a rate of abandonment of the content prior to or during playback of the content.

12. The method of claim 11, wherein the one or more defined parameters comprise at least one of a type of the second device, a type of connection for the second device with which the entity is associated or a geographical location of the second device.

13. The method of claim 11, further comprising:
generating a signal that causes the content to be buffered for the buffer wait time prior to commencement of playback at the second device, wherein the signal includes information indicative of the buffer wait time, wherein the information indicative of the buffer wait time is included in metadata of the content.

14. A method, comprising:
identifying, by a device comprising a processor, one or more values for respective one or more defined parameters, wherein the one or more defined parameters are associated with at least one of an entity associated with the device, a type of the device, a network associated with the device or a type of content for playback on the device; and
determining a buffer wait time for playback of the content on the device based on the one or more values one or more defined parameters, wherein the buffer wait time is associated with a level of experience for the entity related to a rate of abandonment of the content prior to or during playback of the content.

15. The method of claim 14, further comprising:
buffering the content, prior to playback of the content, wherein the buffering is performed for an amount of time that is less than or equal to the buffer wait time.

16. The method of claim 14, wherein the determining comprises selecting the buffer wait time from a plurality of buffer wait times stored in a look-up table at the device.

17. The method of claim 16, wherein the selecting comprises:
selecting a first value for the buffer wait time based on determining that the device is connected to a first type of network; and
selecting a second value for the buffer wait time based on determining that the device is connected to a second type of network, wherein the first value is different from the second value.

18. The method of claim 16, wherein the selecting comprises:
selecting a first value for the buffer wait time based on determining that a type of the device is a first type; and
selecting a second value for the buffer wait time based on determining that a type of the device is a second type, wherein the first value is different from the second value.

19. A method of calculating a buffer wait time for buffering content provided to a client by a server, the method comprising:
modeling a relationship between values of a plurality of parameters and a user experience level with respect to enjoyment of the content by a user of the client to predict different user experience levels for subsets of the plurality of parameters having different values;
receiving parameter information from the client, the parameter information describing parameters including a type of client that will play the content;
computing the buffer wait time based on the modeled relationship and the received parameter information, wherein the buffer wait time is associated with the user experience level; and
providing the computed buffer wait time to the client.

20. The method of claim 19, wherein modeling the relationship comprises:
performing a regression analysis to identify patterns between amounts of time that users watch the content and values of the plurality of parameters in the subsets.

21. The method of claim 19, wherein modeling the relationship comprises:
performing a regression analysis to infer a function for mapping sets of parameters to one or more buffer wait times;
wherein computing the buffer wait time uses the function to map the parameter information to the buffer wait time.

22. The method of claim 19, wherein computing the buffer wait time comprises:
finding a value of the buffer wait time that results in a peak user watch time by the user of the client.

23. The method of claim 19, wherein computing the buffer wait time comprises:
selecting a value of the buffer wait time that corresponds to a defined level of experience for the user.

24. The method of claim 19, wherein computing the buffer wait time comprises:
accessing a look-up table using the received parameter information to select the buffer wait time.

* * * * *